US009720801B2

(12) United States Patent
Yoon (10) Patent No.: US 9,720,801 B2
(45) Date of Patent: Aug. 1, 2017

(54) SYSTEM AND METHOD FOR LINKING DEBUGGING MESSAGE

(71) Applicant: SK PLANET CO., LTD., Seongnam-si, Gyeonggi-do (KR)

(72) Inventor: Jeong Hyun Yoon, Incheon (KR)

(73) Assignee: SK PLANET CO., LTD., Seongnam-si, Gyeonggi-Do (KR)

( * ) Notice: Subject to any disclaimer, the term of this patent is extended or adjusted under 35 U.S.C. 154(b) by 194 days.

(21) Appl. No.: 14/241,274

(22) PCT Filed: Jul. 15, 2013

(86) PCT No.: PCT/KR2013/006312
§ 371 (c)(1),
(2) Date: Feb. 26, 2014

(87) PCT Pub. No.: WO2014/051248
PCT Pub. Date: Apr. 3, 2014

(65) Prior Publication Data
US 2015/0293832 A1   Oct. 15, 2015

(30) Foreign Application Priority Data

Sep. 25, 2012 (KR) ........................ 10-2012-0106462

(51) Int. Cl.
*G06F 9/44* (2006.01)
*G06F 11/36* (2006.01)

(52) U.S. Cl.
CPC ........ *G06F 11/362* (2013.01); *G06F 11/3664* (2013.01)

(58) Field of Classification Search
USPC ......................................................... 717/124
See application file for complete search history.

(56) References Cited

U.S. PATENT DOCUMENTS 5,815,653 A     9/1998  You et al.
7,240,329 B1 *  7/2007  Long ........................ H04L 29/06
                                                        707/999.2
(Continued)

FOREIGN PATENT DOCUMENTS

KR    1020050077075 A    8/2005
KR      100619959 B1    5/2006
(Continued)

OTHER PUBLICATIONS

International Search Report mailed Oct. 1, 2013 for PCT/KR2013/006312.

*Primary Examiner* — Hang Pan
(74) *Attorney, Agent, or Firm* — Hauptman Ham, LLP (57) ABSTRACT

The present invention relates to a system and method for linking a debugging message, and the system for linking a debugging message includes: a web development terminal for creating, if information which needs to be confirmed while developing a web program is input, a debugging message, outputting the debugging message on a debug window displayed in a predetermined area of a screen, and transmitting, if a magic number is input from a user through the debug window, a debugging message registration request signal including web development terminal identification information, the magic number and the debugging message to a service providing device; the service providing device for storing, if the debugging message registration request signal is received from the web development terminal, the debugging message.

2 Claims, 4 Drawing Sheets

(56) References Cited

U.S. PATENT DOCUMENTS

| | | | | |
|---|---|---|---|---|
| 7,369,533 B1* | 5/2008 | Raman | ................. | H04W 4/00 370/328 |
| 2008/0098365 A1* | 4/2008 | Kumar | ................. | G06F 9/4425 717/131 |
| 2011/0154295 A1* | 6/2011 | Aharoni | ................. | G06F 8/74 717/125 |

FOREIGN PATENT DOCUMENTS

| | | |
|---|---|---|
| KR | 1020060066912 A | 6/2006 |
| KR | 101060181 B1 | 2/2011 |

* cited by examiner

IP : [192.168.100.162]  magicNumer : [12345]  (submit) (clear log)

(47:42.682 Unknown)made by button
(47:43.600 Unknown)made by button
(47:44.420 Unknown)made by button
(47:45.436 Unknown)made by button
(47:46.296 Unknown)made by button
(47:47.173 Unknown)made by button
(47:48.159 Unknown)made by button
(47:48.908 Unknown)made by button

SYSTEM AND METHOD FOR LINKING DEBUGGING MESSAGE

CROSS REFERENCE TO RELATED APPLICATION

This application claims the priority of Korea Patent Application No. 10-2012-0106462, filed on Sep. 25, 2012 in the KIPO (Korean Intellectual Property Office). Further, this application is the National Phase application of International Application No. PCT/KR2013/006312 filed Jul. 15, 2013, which designates the United States and was published in Korean.

TECHNICAL FIELD

The present invention relates to a system and method for linking a debugging message, and more specifically, to a system and method for linking a debugging message, in which if information which needs to be confirmed by a developer is input while developing a web program at a web development terminal, a debugging message for the information is output on a debug window displayed at a predetermined area of a screen, and the output debugging message is registered in a service providing device, and thus the debugging message output on the web development terminal may be confirmed even at a target device having a screen larger than that of the web development terminal.

BACKGROUND ART

A developer uses an inspector provided by a browser in order to confirm a debugging message at a web site. Although such an inspector exists in a browser of a terminal such as a PC having a large screen, it is not easy to confirm a debugging message in a mobile environment.

In order to confirm a debugging message generated at a terminal having a mobile environment, the debugging message generated in the mobile environment may be confirmed at a desktop computer after connecting the desktop computer to a mobile device using a universal serial bus (USB) and setting the desktop computer.

That is, a debugging message is displayed on the PC if the PC for confirming the debugging message is connected to a mobile device embedded with a program under development and the debugging message generated at the mobile device is transmitted to the PC through a serial port.

However, in the prior art, it is inconvenient in that the mobile device should be connected to the PC using a wire in order to confirm a debugging message generated at the mobile device currently developing a web program.

DISCLOSURE OF INVENTION

Technical Problem

Therefore, the present invention has been made in view of the above problems, and it is an object of the present invention to provide a system and method for linking a debugging message, which can wirelessly confirm the debugging message generated in a mobile environment through a desktop browser without using a serial port.

Another object of the present invention is to provide a system and method for linking a debugging message, in which the debugging message associated with information desired to be confirmed by a developer can be confirmed using browsers of a mobile device and a target device while development related to a web application is under progress in a mobile environment.

Still another object of the present invention is to provide a system and method for linking a debugging message, in which the debugging message desired to be confirmed by a developer can be confirmed in a mobile environment.

Technical Solution

To accomplish the above objects, according to one aspect of the present invention, there is provided a system for linking a debugging message, the system including: a web development terminal for creating, if information which needs to be confirmed while developing a web program is input, a debugging message for the input information by processing constitutional elements of the web program, outputting the debugging message on a debug window displayed in a predetermined area of a screen, and transmitting, if a magic number is input from a user through the debug window, a debugging message registration request signal including web development terminal identification information, the magic number and the debugging message to a service providing device; the service providing device for storing, if the debugging message registration request signal is received from the web development terminal, a combination of the web development terminal identification information and the magic number together with the debugging message, and acquiring and transmitting, if a debugging message request signal including web development terminal identification information and a magic number is received, a debugging message which uses a combination of the web development terminal identification information and the magic number as identification information to a target device; and the target device for connecting to the service providing device, transmitting, if web development terminal identification information and a magic number are input, a debugging message request signal including the web development terminal identification information and the magic number to the service providing device, receiving a debugging message from the service providing device, and outputting the debugging message.

The debug window is displayed in a predetermined area of the screen separate from a web page under test and is configured of a debugging message output area for outputting the debugging message, a web development terminal identification information display area for displaying the identification information of the web development terminal, and a magic number input area for inputting the magic number.

According to another aspect of the present invention, there is provided a web development terminal including: a communication unit for communicating with a service providing device through a communication network; an input unit; an output unit for outputting a web page under test; and a debugging message output processing unit for creating, if information which needs to be confirmed while developing a web program is input through the input unit, a debugging message for the input information by processing constitutional elements of the web program, displaying a debug window in a predetermined area of a screen separate from the web page, and outputting the created debugging message on the debug window.

The web development terminal may further include a link processing unit for transmitting, if a magic number is input through the debug window, a debugging message registration request signal including identification information of its own, the magic number and the debugging message to a service providing device.

The debug window may be configured of a debugging message output area for outputting the debugging message, an identification information display area for displaying the identification information of the web development terminal, and a magic number input area for inputting the magic number, and the debug window may move separately from the web page.

According to still another aspect of the present invention, there is provided a service providing device including: a communication unit for communicating with a web development terminal or a target device through a communication network; a database for storing debugging messages; a debugging message registration unit for storing, if a debugging message registration request signal including web development terminal identification information, a magic number and a debugging message is received through the communication unit, the debugging message in the database using a combination of the web development terminal identification information and the magic number as identification information; and a debugging message providing unit for acquiring, when a debugging message request signal including web development terminal identification information and a magic number is received through the communication unit, a debugging message which uses a combination of the web development terminal identification information and the magic number as identification information from the database and transmitting the debugging message to the target device.

According to still another aspect of the present invention, there is provided a target device including: a communication unit for communicating with a service providing device through a communication network; an output unit; and a debugging message request processing unit for connecting to the service providing device through the communication unit, transmitting, if web development terminal identification information and a magic number are input, a debugging message request signal including the web development terminal identification information and the magic number to the service providing device, receiving a debugging message from the service providing device, and outputting the debugging message through the output unit.

The debugging message may be output as text through a web browser.

According to still another aspect of the present invention, there is provided a method of linking a debugging message, the method including the steps of: creating, if information which needs to be confirmed while developing a web program is input, a debugging message for the input information by processing constitutional elements of the web program, and outputting the debugging message on a debug window displayed in a predetermined area of a screen, by a web development terminal; transmitting, if a magic number is input through the debug window, a debugging message registration request signal including web development terminal identification information, the magic number and the debugging message to a service providing device, by the web development terminal; and storing a combination of the web development terminal identification information and the magic number together with the debugging message, by the service providing device.

The method of linking a debugging message may further include the steps of: connecting to the service providing device, and transmitting, if web development terminal identification information and a magic number are input, a debugging message request signal including the web development terminal identification information and the magic number to the service providing device, by a target device; confirming the web development terminal identification information and the debugging message by analyzing the debugging message request signal received from the target device, acquiring a debugging message which uses a combination of the confirmed web development terminal identification information and magic number as identification information from a provided database and transmitting the debugging message to the target device, by the service providing device; and receiving the debugging message from the service providing device and outputting the received debugging message, by the target device.

According to still another aspect of the present invention, there is provided a method of linking a debugging message by a web development terminal, the method including the steps of: creating, if information which needs to be confirmed while developing a web program is input, a debugging message for the input information by processing constitutional elements of the web program; displaying a debug window in a predetermined area of a screen separate from a currently displayed web page; and outputting the created debugging message on the debug window.

The method of linking a debugging message may further include the step of transmitting, if a magic number is input through the debug window, a debugging message registration request signal including identification information of its own, the magic number and the debugging message to a service providing device.

According to still another aspect of the present invention, there is provided a recording medium which can be read by an electronic device, in which a method of linking a debugging message is recorded as a program, the method including the steps of: creating, if information which needs to be confirmed while developing a web program is input, a debugging message for the input information by processing constitutional elements of the web program; displaying a debug window in a predetermined area of a screen separate from a currently displayed web page; and outputting the created debugging message on the debug window.

According to still another aspect of the present invention, there is provided a method of linking a debugging message by a service providing device, the method including the steps of: storing, if a debugging message registration request signal including web development terminal identification information, a magic number and a debugging message is received from a web development terminal, the debugging message in a database using a combination of the web development terminal identification information and the magic number as identification information; confirming, if a debugging message request signal including web development terminal identification information and a magic number is received from a target device, the web development terminal identification information and the magic number by analyzing the received debugging message request signal; and acquiring a debugging message which uses a combination of the confirmed web development terminal identification information and magic number as identification information from the database and transmitting the debugging message to the target device.

According to still another aspect of the present invention, there is provided a recording medium which can be read by an electronic device, in which a method of linking a debugging message is recorded as a program, the method including the steps of: storing, if a debugging message registration request signal including web development terminal identification information, a magic number and a debugging message is received from a web development terminal, the debugging message in a database using a combination of the web development terminal identification information and the magic number as identification information; confirming, if a debugging message request signal including web development terminal identification information and a magic number is received from a target device, the web development terminal identification information and the magic number by analyzing the received debugging message request signal; and acquiring a debugging message which uses a combination of the confirmed web development terminal identification information and magic number as identification information from the database and transmitting the debugging message to the target device.

Advantageous Effects

According to the present invention, a debugging message generated in a mobile environment can be confirmed wirelessly through a desktop browser without using a serial port.

In addition, a debugging message associated with information desired to be confirmed by a developer can be confirmed using browsers of a mobile device and a target device while development related to a web application is under progress in a mobile environment.

In addition, a debugging message desired to be confirmed by a developer can be confirmed in a mobile environment.

< DESCRIPTION OF SYMBOLS >

| | |
|---|---|
| 100: Web development terminal | 110, 210, 310: Communication unit |
| 120, 320: Input unit | 130, 330: Output unit |
| 140, 340: Storage unit | 150: Debugging message output processing unit |
| 160: Link processing unit | 200: Service providing device |
| 220: Database | 230: Debugging message registration unit |
| 240: Debugging message providing unit | 300: Target device |
| 350: Debugging message request processing unit | |

BEST MODE FOR CARRYING OUT THE INVENTION

The above objects and technical configurations of the present invention and details of the operational effects according thereto will be understood more clearly by the following explanation described in detail with reference to the drawings accompanied in the specification of the present invention.

Figure 1:
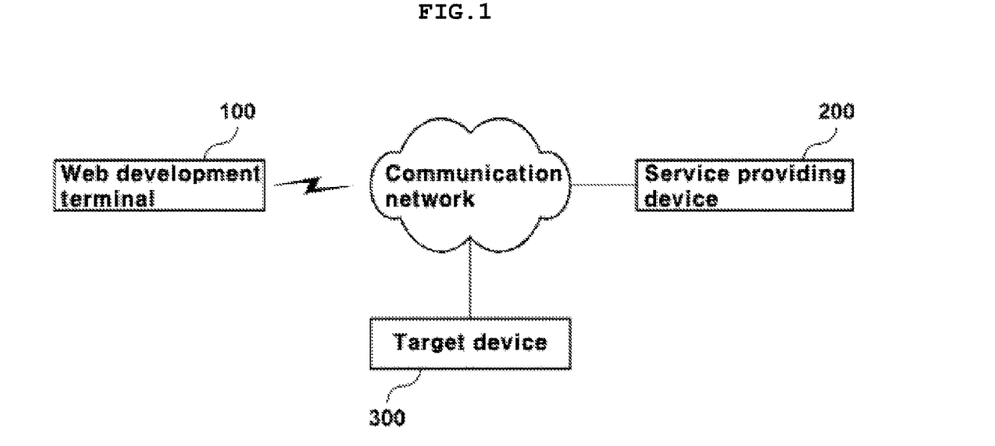
FIG. 1 is a view showing a system for linking a debugging message according to an embodiment of the present invention.

FIG. 1 is a view showing a system for linking a debugging message according to an embodiment of the present invention.

Referring to FIG. 1, a system for linking a debugging message includes a web development terminal 100 for developing a web program, a service providing device 200, and a target device 300.

If information which needs to be confirmed while developing a web program is input, the web development terminal 100 creates a debugging message for the input information by processing constitutional elements included in the web program and outputs the debugging message on a debug window displayed in a predetermined area of a screen separate from the currently output web page. Here, the debug window may exist in a predetermined area of the screen, i.e., at a fixed position in a lower portion of the screen, and does not move although a web page under test is moved. Accordingly, the debug window is positioned in a predetermined area at a lower portion of the screen of the web development terminal, and the web page under test is displayed in the other area. Here, although it is described that the debug window is positioned at a lower portion of the screen, the debug window may be displayed at any position on the up, down, left or right side of the screen according to the design of a user.

In addition, if a magic number is input by the developer through the debug window, the web development terminal 100 transmits a debugging message registration request signal including web development terminal identification information, the magic number and the currently displayed debugging message to the service providing device 200. Here, the web development terminal identification information includes an IP or the like of the web development terminal, and the magic number may be a random number. A combination of the web development terminal identification information and the magic number may be used as identification information of the debugging message.

Any user device mounted with a communication function and a near field communication function may be applied as the web development terminal 100. For example, the web development terminal 100 may be a variety of devices such as a notebook computer, a wireless communication terminal, a smart phone, a portable multimedia player (PMP), a personal digital assistant (PDA), a tablet PC, a set-top box, a smart TV and the like.

The web development terminal 100 will be described in detail with reference to FIG. 2.

When the debugging message registration request signal including the web development terminal identification information, the magic number and the debugging message is received from the web development terminal 100, the service providing device 200 stores a combination of the web development terminal identification information and the magic number together with the debugging message.

In addition, if a debugging message request signal including web development terminal identification information and a magic number is received from the target device 300, the service providing device 200 acquires a debugging message which uses a combination of the web development terminal identification information and the magic number as identification information and transmits the debugging message to the target device 300.

The service providing device 200 will be described in detail with reference to FIG. 3.

The target device 300 is connected to the service providing device 200, and if the web development terminal identification information and the magic number are input, the target device 300 transmits a debugging message request signal including the input web development terminal identification information and magic number to the service providing device 200, receives a debugging message from the service providing device 200, and outputs the debugging message on a web page.

Any user device mounted with a communication function and a near field communication function may be applied as the target device 300. At this point, the target device 300 may be a device having a screen larger than that of the web development terminal 100.

The target device 300 will be described in detail with reference to FIG. 4.

Figure 2:
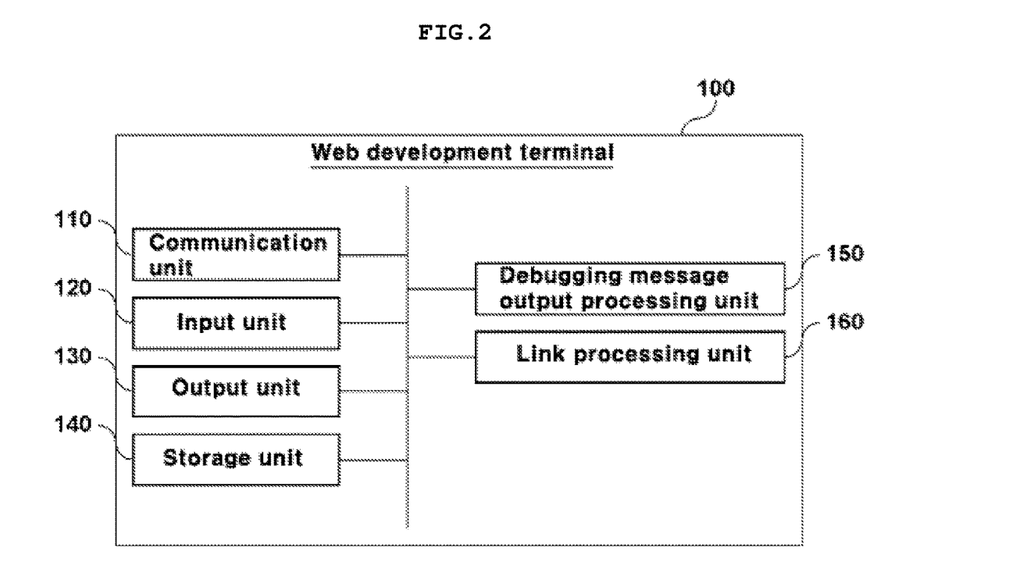
FIG. 2 is a block diagram schematically showing the configuration of a web development terminal according to an embodiment of the present invention.

FIG. 2 is a block diagram schematically showing the configuration of a web development terminal according to an embodiment of the present invention.

Referring to FIG. 2, the web development terminal includes a communication unit 110 for transmitting and receiving data through a communication network, an input unit 120, an output unit 130, a storage unit 140, a debugging message output processing unit 150 and a link processing unit 160.

The communication unit 110 is a communication means for interconnecting the web development terminal 100 and the service providing device through a communication network and may include, for example, a wireless communication module for mobile communication, satellite communication or the like, a wired communication module for the Internet or the like, and a near field wireless communication module for WiFi or the like.

The input unit 120 is a means for receiving a user request for controlling operation of the web development terminal 100 and converts a request of a developer into an electrical signal according to handling of the developer. The input unit 120 refers to a key input means for receiving character, number or text information from the developer, and the key input means may be implemented as a keyboard, a keypad, a touch screen or the like.

The output unit 130 displays a web page currently developed by the web development terminal 100. In addition, the output unit 130 refers to a display means for displaying screen information according to driving of an application, and such an output unit 130 is preferably implemented as a small-sized flat panel screen display device such as a liquid crystal display (LCD), an organic light emitting diode (OLED) or the like. In addition, the output unit 130 may be duplicated with the input unit 120 described above to be implemented in the form of a touch screen.

In addition, the output unit 130 outputs a web page under test by the web developer, and a debug window is displayed in a predetermined area of the screen separate from the web page. A console.log message output to be confirmed by the developer is output on the debug window in real-time. In addition, the web development terminal 100 is a terminal having a mobile environment, and the size of a screen output on the output unit 130 may be small.

The storage unit 140 stores a program which is needed to control operation of the web development terminal 100 and data generated while the program is executed.

In addition, the storage unit 140 stores information which needs to be confirmed while developing a web program and is input by the developer through the input unit 120. Here, the information which needs to be confirmed while developing a web program may include a variable or the like.

If information which needs to be confirmed while developing a web program is input, the debugging message output processing unit 150 creates a debugging message for the input information by processing constitutional elements included in the web program.

In addition, the debugging message output processing unit 150 displays the debug window in a predetermined area of the screen separate from the currently displayed web page and outputs a debugging message on the debug window. That is, the debugging message output processing unit 150 may display the debug window at a fixed position of the screen, e.g., at a fixed position in a lower portion of the screen, displayed on the output unit 130 and display the web page in the other area of the screen.

If a magic number is input through the debug window, the link processing unit 160 transmits a debugging message registration request signal including the web development terminal identification information, the magic number and the currently displayed debugging message to the service providing device. That is, the developer inputs a certain number in a magic number input area of the debug window as a magic number. Then, the link processing unit 160 determines that the developer desires to register the debugging message currently output on the debug window into the service providing device to see the debugging message through a target device having a large screen, and transmits the debugging message registration request signal including the web development terminal identification information, the magic number and the currently displayed debugging message to the service providing device. At this point, the debugging message may be a text form.

Figure 3:
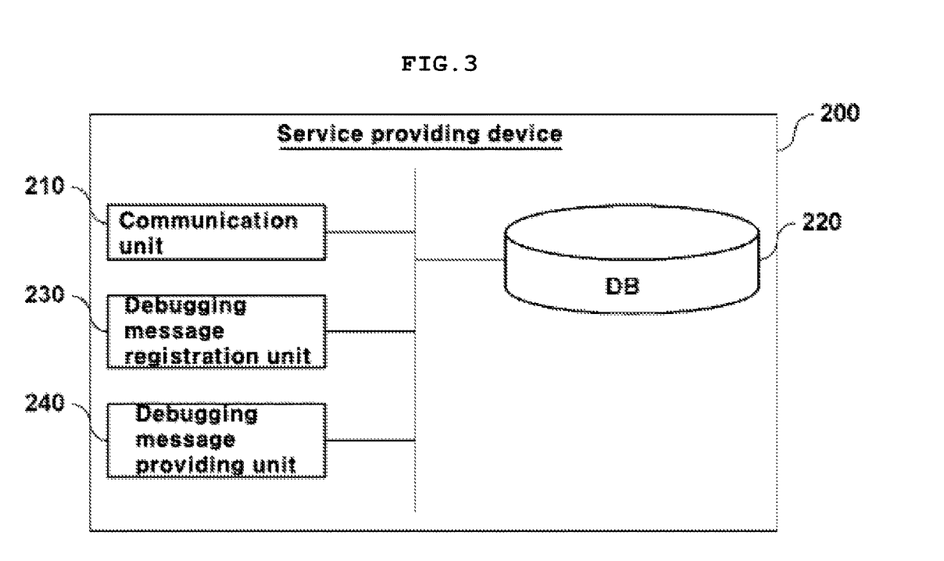
FIG. 3 is a block diagram schematically showing the configuration of a service providing device according to an embodiment of the present invention.

FIG. 3 is a block diagram schematically showing the configuration of a service providing device according to an embodiment of the present invention.

Referring to FIG. 3, the service providing device 200 includes a communication unit 210, a database 220, a debugging message registration unit 230 and a debugging message providing unit 240.

The communication unit 210 is a communication means for interconnecting the service providing device and the web development terminal through a communication network or interconnecting the service providing device and the target device through a communication network and may include, for example, a wireless communication module for mobile communication, satellite communication or the like, a wired communication module for the Internet or the like, and a near field wireless communication module for WiFi or the like.

The database 220 stores a debugging message together with a combination of web development terminal identification information and a magic number. Here, the combination of web development terminal identification information and a magic number may be used as identification information for identifying the debugging message.

When the debugging message registration request signal including the web development terminal identification information, the magic number and the debugging message is received through the communication unit 210, the debugging message registration unit 230 stores the debugging message in the database 220 together with a combination of the web development terminal identification information and the magic number. At this point, the debugging message registration unit 230 may store the debugging message as a text file.

When a debugging message request signal including web development terminal identification information and a magic number is received through the communication unit 210, the debugging message providing unit 240 searches the database 220 and acquires a debugging message which uses a combination of the web development terminal identification information and the magic number as identification information. Then, the debugging message providing unit 240 transmits the acquired debugging message to a corresponding target device.

Figure 4:
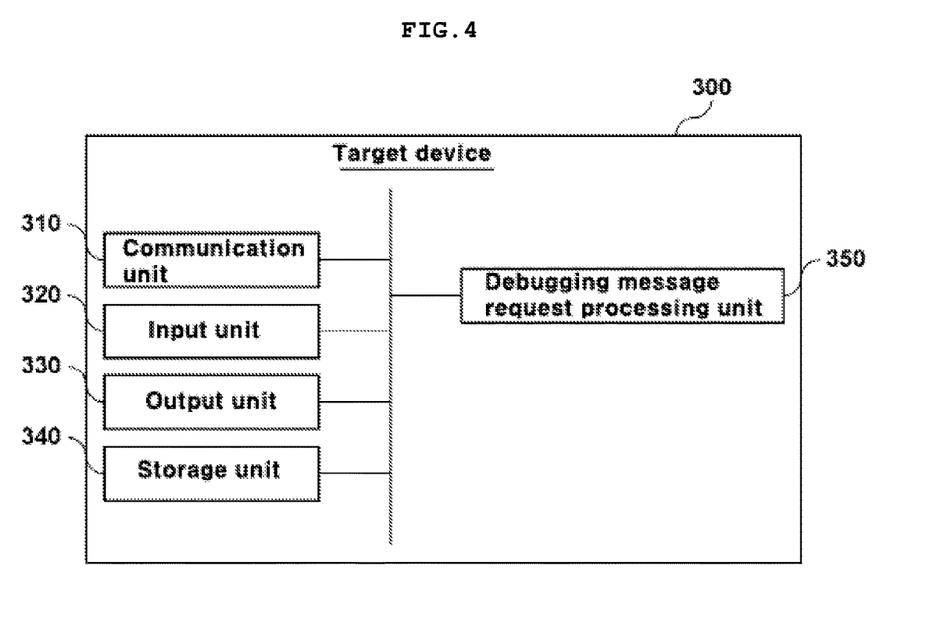
FIG. 4 is a block diagram schematically showing the configuration of a target device according to an embodiment of the present invention.

FIG. 4 is a block diagram schematically showing the configuration of a target device according to an embodiment of the present invention.

Referring to FIG. 4, the target device 400 includes a communication unit 310 for communicating with the service providing device, an input unit 320, an output unit 330, a storage unit 340 and a debugging message request processing unit 350.

Since the communication unit 310, the input unit 320 and the storage unit 340 are the same as the configuration of the web development terminal shown in FIG. 2, descriptions thereof will be omitted.

The output unit 330 outputs the debugging message output on the debug window of the web development terminal. In addition, the output unit 330 may have a screen larger than the screen of the web development terminal.

In addition, the output unit 330 refers to a display means for displaying screen information according to driving of an application, and such an output unit 330 is preferably implemented as a small-sized flat panel screen display device such as a liquid crystal display (LCD), an organic light emitting diode (OLED) or the like. In addition, the output unit 330 may be duplicated with the input unit 320 described above to be implemented in the form of a touch screen.

The debugging message request processing unit 350 connects to the service providing device through the communication unit 310, and if web development terminal identification information and a magic number are input, the debugging message request processing unit 350 transmits a debugging message request signal including the input web development terminal identification information and magic number to the service providing device, receives a debugging message from the service providing device and outputs the debugging message through the output unit 330. At this point, the debugging message is output as text through a web browser.

A developer desires to confirm the debugging message output on the web development terminal having a small screen using the target device 300 having a larger screen. Therefore, the developer connects to the service providing device using the target device 300 and selects a debugging message providing menu provided by the service providing device. Then, an identification information input screen for inputting identification information of the debugging message is displayed on the target device 300, and the developer inputs identification information, e.g., the web development terminal identification information and the magic number, assigned to the debugging message desired to be seen, through the identification information input screen. Then, the service providing device transmits a stored debugging message to the target device 300 together with the input web development terminal identification information and magic number. Accordingly, the developer may confirm the debugging message using the target device 300 having a large screen.

Figure 5:
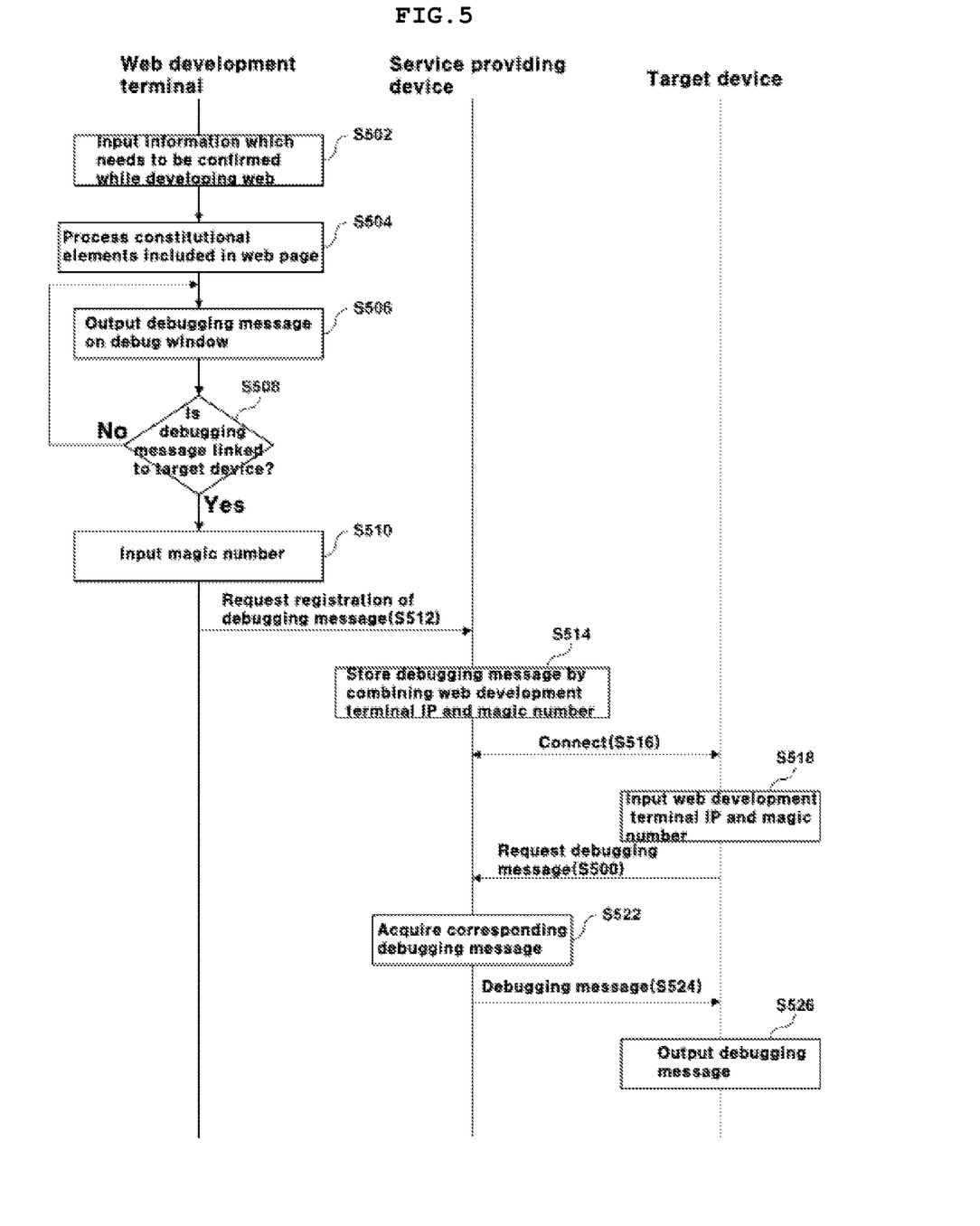
FIG. 5 is a flowchart illustrating a method of linking a debugging message according to an embodiment of the present invention.
Figure 6:
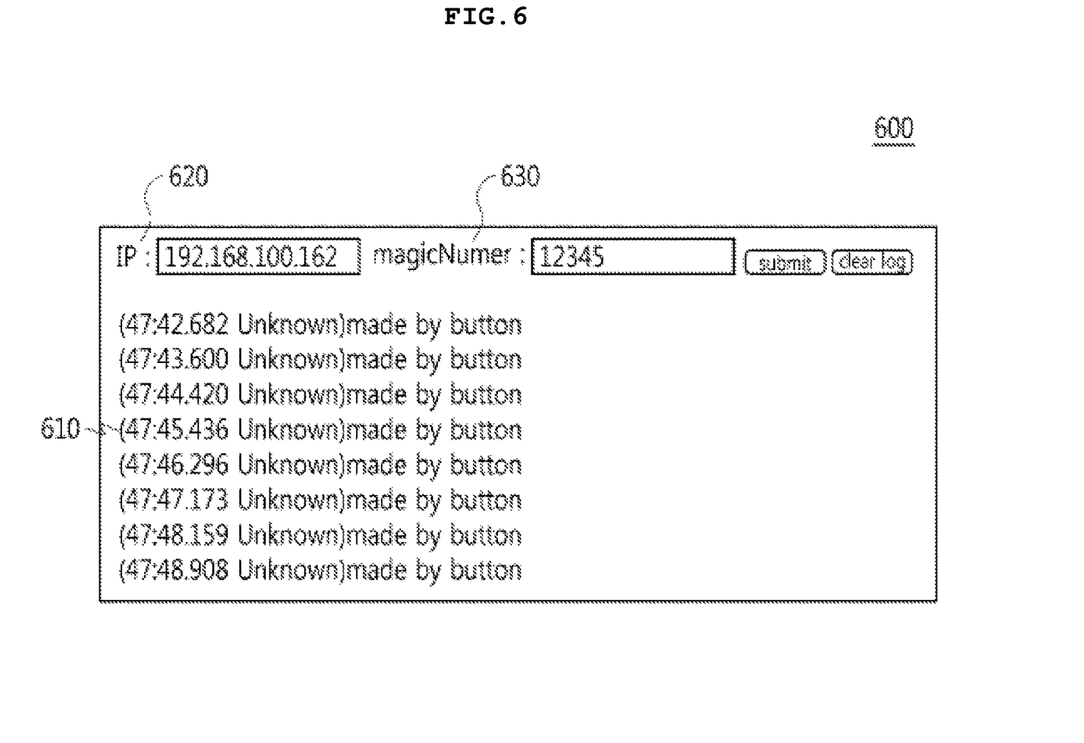
FIG. 6 is an exemplary view showing a screen of a debug window according to an embodiment of the present invention.

FIG. 5 is a flowchart illustrating a method of linking a debugging message according to an embodiment of the present invention, and FIG. 6 is an exemplary view showing a screen of a debug window according to an embodiment of the present invention.

Referring to FIG. 5, if information which needs to be confirmed while developing a web program is input by a developer S502, a debugging message for the input information is created by processing constitutional elements included in the web page S504. That is, the web development terminal creates a debugging message for the information input by the developer by processing the constitutional elements included in the web page under development. For example, if a user specifies a specific variable while coding a web page, the web development terminal applies the specific variable to the currently developed web program and creates a debugging message using values created using the specific variable.

If the step S504 is performed successfully, the web development terminal outputs the debugging message on a debug window displayed in a predetermined area of the screen separate from the web page S506. That is, the web development terminal displays the debug window in a predetermined area of the screen and outputs the debugging message on the displayed debug window. Here, the debug window is a window positioned at a lower portion of the screen of the web development terminal in a predetermined size, and although a web page under test is moved, the debug window does not move. Accordingly, the debug window is positioned in a predetermined area at a lower portion of the screen of the web development terminal, and the web page under test is displayed in the other area.

Describing the debug window with reference to FIG. 6, the debug window 600 may be configured of a debugging message output area 610 for outputting a debugging message, a web development terminal identification information display area 620 for displaying identification information of the web development terminal (e.g., an IP of the web development terminal), and a magic number input area 630 for inputting a magic number.

As described above, a console.log message output to be confirmed by the developer is output on the debug window of the web development terminal in real-time. However, it is difficult to confirm the debugging message since the web development terminal is in a mobile environment having a small screen. Accordingly, the developer desires to confirm the debugging message output in the mobile environment using a web browser of a target device such as a PC having a further larger screen.

That is, if the developer desires to see the debugging message output on the web development terminal through a target device S508, the developer inputs a magic number in the magic number input area of the debug window S510. That is, the developer inputs a desired magic number in the magic number input area on the debug window. Here, the magic number may be a certain number specified by the developer.

If the step S510 is performed successfully, the web development terminal transmits a debugging message registration request signal including web development terminal identification information, the magic number and the debugging message to the service providing device S512. Here, the web development terminal identification information may be an IP of the web development terminal, and the debugging message may be a TXT file form.

If the step S512 is performed successfully, the service providing device stores a combination of the web development terminal identification information and the magic number in the database together with the debugging message S514. At this point, the service providing device stores the debugging message as a text file, and the combination of the web development terminal identification information and the magic number may be identification information for identifying the debugging message.

Then, the developer connects to the service providing device using a target device having a large screen S516 and inputs web development terminal identification information and a magic number into the connected web page S518. That is, if the developer desires to confirm the debugging message output on the web development terminal having a small screen using a target device having a further larger screen, the developer connects to the service providing device using the target device and selects a debugging message providing menu provided by the service providing device. Then, an identification information input screen for inputting identification information of the debugging message is displayed on the target device, and the developer inputs identification information, e.g., web development terminal identification information and a magic number, assigned to the debugging message desired to be seen, through the identification information input screen.

Then, the target device transmits a debugging message request signal including the web development terminal identification information and the magic number to the service providing device S520.

The service providing device searches the database and acquires a debugging message which uses a combination of the received web development terminal identification information and magic number as identification information S522 and transmits the acquired debugging message to the target device S524.

The target device outputs the debugging message received from the service providing device on the web page S526. At this point, the target device outputs a message the same as the debugging message output on the debug window of the web development terminal.

On the other hand, according to another aspect of the present invention, there is provided a recording medium which can be read by an electronic device, in which a debugging message linking method is recorded as a program, the method comprising the steps of: creating, if information which needs to be confirmed while developing a web program is input, a debugging message for the input information by processing constitutional elements of the web program; displaying a debug window in a predetermined area of a screen separate from a currently displayed web page; and outputting the created debugging message on the debug window.

In addition, according to still another aspect of the present invention, there is provided a recording medium which can be read by an electronic device, in which a debugging message linking method is recorded as a program, the method comprising the steps of: storing, if a debugging message registration request signal including web development terminal identification information, a magic number and a debugging message is received from a web development terminal, the debugging message in a database using a combination of the web development terminal identification information and the magic number as identification information; confirming, if a debugging message request signal including web development terminal identification information and a magic number is received from a target device, the web development terminal identification information and the magic number by analyzing the received debugging message request signal; and acquiring a debugging message which uses a combination of the confirmed web development terminal identification information and magic number as identification information from the database and transmitting the debugging message to the target device.

Such a method of linking a debugging message can be created as a program, and codes and code segments configuring the program may be easily inferred by programmers in the art. In addition, the program related to the web page scrollbar display method in the web page providing server may be stored in an information storage medium (a readable medium) that can be read by an electronic apparatus and read and executed by the electronic apparatus.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

The present invention may confirm a debugging message desired to be confirmed by a developer in a mobile environment and may be applied to a system and method for linking a debugging message so that the debugging message generated in the mobile environment may be remotely confirmed through a desktop browser.

The invention claimed is:

1. A system for linking a debugging message, the system comprising:
   a service providing apparatus;
   a target apparatus; and
   a web development terminal comprising a first communication unit, a first processor, a first input unit and a first output unit, the first processor configured to, when information to be confirmed while developing a web program is input through the first input unit,
   perform constitutional elements of the web program,
   create a debugging message for the input information,
   display the created debugging message on a debug window displayed in a predetermined area of the first output unit, and
   transmit, when a magic number is input from a user through the debug window, a debugging message registration request signal including web development terminal identification information, the input magic number and the created debugging message to the service providing apparatus through the first communication unit,
   wherein
   the service providing apparatus comprises a second communication unit, a second processor and a database, the second processor is configured to
   store, when the debugging message registration request signal is received from the web development terminal through the second communication unit, a combination of the received web development terminal identification information and the received magic number together with the received debugging message in the database, acquire, when a debugging message request signal including web development terminal identification information and a magic number is received, a debugging message which uses a combination of the received web development terminal identification information and the received magic number as identification information to the target apparatus, and transmit the acquired debugging message to the target apparatus, and the target apparatus comprises a third communication unit, a third processor, a second input unit and a second output unit, the third processor is configured to connect to the service providing apparatus, transmit, when web development terminal identification information and a magic number are input through the second input unit, a debugging message request signal including the input web development terminal identification information and the input magic number to the service providing apparatus through the third communication unit, receive a debugging message from the service providing apparatus, and output the received debugging message on the second output unit, and the magic number is a predetermined number.

2. The system according to claim 1, wherein the predetermined area is a separate area from a web page under test and the debug window is configured of a debugging message output area for outputting the created debugging message, a web development terminal identification information display area for displaying the web development terminal identification information, and a magic number input area for inputting the magic number.

* * * * *